United States Patent
Dhong et al.

(10) Patent No.: US 6,345,286 B1
(45) Date of Patent: Feb. 5, 2002

(54) 6-TO-3 CARRY-SAVE ADDER

(75) Inventors: Sang Hoo Dhong; Hung Cai Ngo, both of Austin; Kevin John Nowka, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,593

(22) Filed: Oct. 30, 1998

(51) Int. Cl.[7] .................................................. G06F 7/50
(52) U.S. Cl. ........................ 708/708; 708/702; 708/629
(58) Field of Search ................................. 708/620, 625, 708/629, 700, 708, 501, 709

(56) References Cited

U.S. PATENT DOCUMENTS

| | | | | |
|---|---|---|---|---|
| 4,969,118 A | * | 11/1990 | Montoye et al. ............ 708/501 |
| 5,327,368 A | * | 7/1994 | Eustace et al. ............. 708/708 |
| 5,347,482 A | * | 9/1994 | Williams ..................... 708/625 |
| 5,442,576 A | * | 8/1995 | Gergen et al. .............. 708/209 |
| 5,838,940 A | * | 11/1998 | Savkar et al. ............... 712/216 |
| 6,099,158 A | * | 8/2000 | Gorshtein et al. ..... 364/748.11 |

* cited by examiner

Primary Examiner—Chuong Dinh Ngo
(74) Attorney, Agent, or Firm—Casimer K. Salys; Bracewell & Patterson, L.L.P.

(57) ABSTRACT

A 6-to-3 carry-save binary adder is disclosed. The 6-to-3 carry-save adder includes a means for receiving six data inputs and a means for simultaneously adding the six data inputs to generate a first data output, a second data output, and a third data output. The first data output is a SUM output, the second data output is a CARRY_2 output, and the third data output is a CARRY_4 output.

8 Claims, 5 Drawing Sheets

6-TO-3 CARRY-SAVE ADDER

BACKGROUND OF THE INVENTION

1. Technical Field

The present invention relates to an apparatus for data processing in general, and in particular to a binary adder. Still more particularly, the present invention relates to a 6-to-3 carry-save binary adder.

2. Description of the Prior Art

The two most commonly encountered binary adders in digital arithmetic circuit arrangements are carry-propagate adders (CPAs) and carry-save adders (CSAs). CPAs are typically designed to have two data inputs and one output known as a sum. CPAs operate according to well-known principles in which addend bits of the same order are added together, and a carry bit will be transferred to an adjacent higher order bit when required. The final sum is directly derived from a bit-by-bit addition, with an appropriate carry to an adjacent higher order bit and a single bit carry out from the highest order bit position. The ripple carry of a CPA tends to result in slow non-parallel operations because high order bits computations are dependent on the results from low order bits.

CSAs, on the other hand, typically have three data inputs and two outputs. Carry bits in CSAs are accumulated separately from the sum bits of any given order (or position). The output of CSAs are two vectors, namely, a sum and a carry, which when added together yield the final result. The benefit of a CSA is that high order bits have no dependency on any low order bit because all bit positions are calculated independently, thereby avoiding the propagation latency associated with carry bits in CPAs. Because of their speed and simplicity, CSAs are pervasively found in digital logic designs.

The present disclosure provides an improved CSA capable of simultaneously handling more inputs than any prior art CSA without only small increase in the required silicon area.

SUMMARY OF THE INVENTION

In accordance with a preferred embodiment of the present invention, a 6-to-3 carry-save adder includes a means for receiving six data inputs and a means for simultaneously adding the six data inputs to generate a first data output, a second data output, and a third data output. Preferably, the first data output is a SUM output, the second data output is a CARRY_2 output, and the third data output is a CARRY_4 output.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
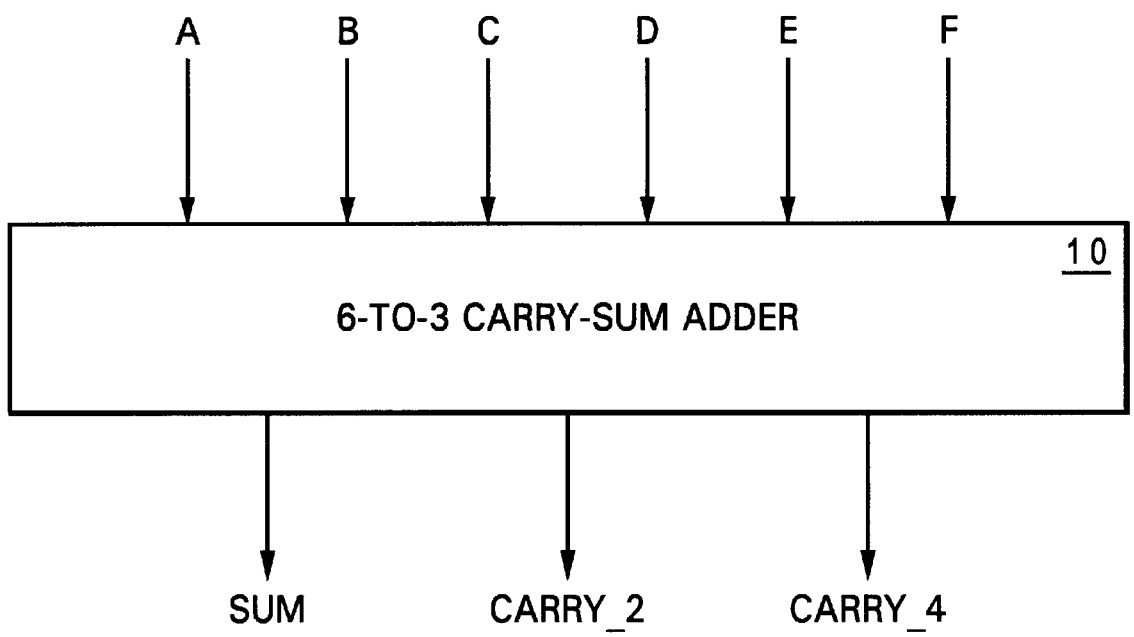
FIG. 1 is a block diagram of a 6-to-3 carry-save adder in accordance with a preferred embodiment of the present invention.

With reference now to the drawings, and in particular to FIG. 1, there is illustrated a block diagram of a 6-to-3 carry-save adder (CSA) in accordance with a preferred embodiment of the present invention. As shown, a 6-to-3 CSA 10 includes six data inputs, for example, A, B, C, D, E, and F. Each of data inputs A through F represents a single bit of a corresponding binary number. By simultaneously adding all six data inputs together, 6-to-3 CSA 10 produces three outputs, which includes a SUM output, a CARRY_2 output (i.e., a first carry-out), and a CARRY_4 output (i.e., a second carry-out). Preferably, the SUM output will be asserted when the sum of the six data inputs is an odd number (i.e., 1, 3, or 5); the CARRY_2 output will be asserted when the sum of the six data inputs is a 2, 3, or 6; and the CARRY_4 output will be asserted when the sum of the six data inputs is equal to or greater than 4 (i.e., 4, 5, or 6).

Figure 2:
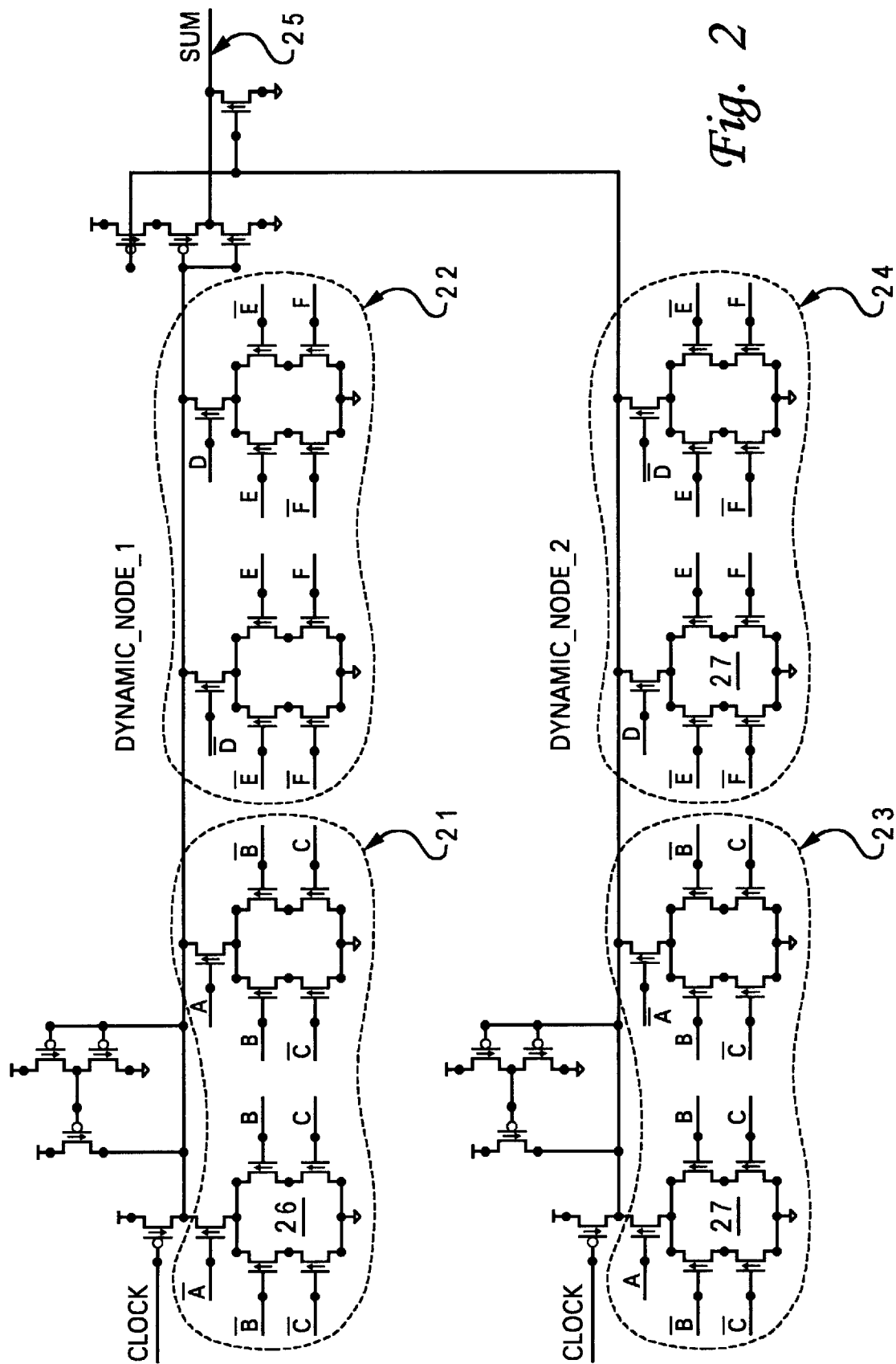
FIG. 2 is a schematic diagram of a circuit for generating a SUM output for the 6-to-3 carry-save adder from FIG. 1, in accordance with a preferred embodiment of the present invention.

With reference now to FIG. 2, there is depicted a schematic diagram of a circuit for generating a SUM output for 6-to-3 carry-save adder 10 from FIG. 1, in accordance with a preferred embodiment of the present invention. The six data inputs are preferably divided into two separate groups, with three data inputs assigned to each group. For example, group I includes data inputs A, B, and C; and group II includes data inputs D, E, and F. Accordingly, two separate groups of circuitry, namely, an odd group circuit and an even group circuit, are utilized to count the number of odd logical 1's and the number of even logical 1's, respectively, in each of groups I and II. As shown, the odd group circuits include odd group circuits 23 and 24 while the even group circuits include even group circuits 21 and 22.

Because of the orthogonality of the odd and even group circuits, even group circuits 21 and 22 can be connected together in a first dynamic node called DYNAMIC_NODE_1; and odd group circuits 23 and 24 can be connected together in a second dynamic node called DYNAMIC_NODE_2. In addition, the data inputs in all the group circuits in FIG. 2 are organized in such a way that some portion of the logic within these group circuits can be shared between two group circuits. For example, XOR logic circuit 26 for inputs B, $\overline{B}$, C, and $\overline{C}$ within even group circuit 21 can be shared between XOR logic circuit 27 for inputs B, $\overline{B}$, C, and $\overline{C}$ within odd group circuit 23.

With the circuit arrangement shown in FIG. 2, SUM output 25 will be asserted when one group contains an odd number of logical 1's and the other group contains an even number of logical 1's, in other words, when the sum of all six data inputs is an odd number. Otherwise, SUM output 25 will not be asserted, which indicates that the sum of all six data inputs is an even number.

Figure 3:
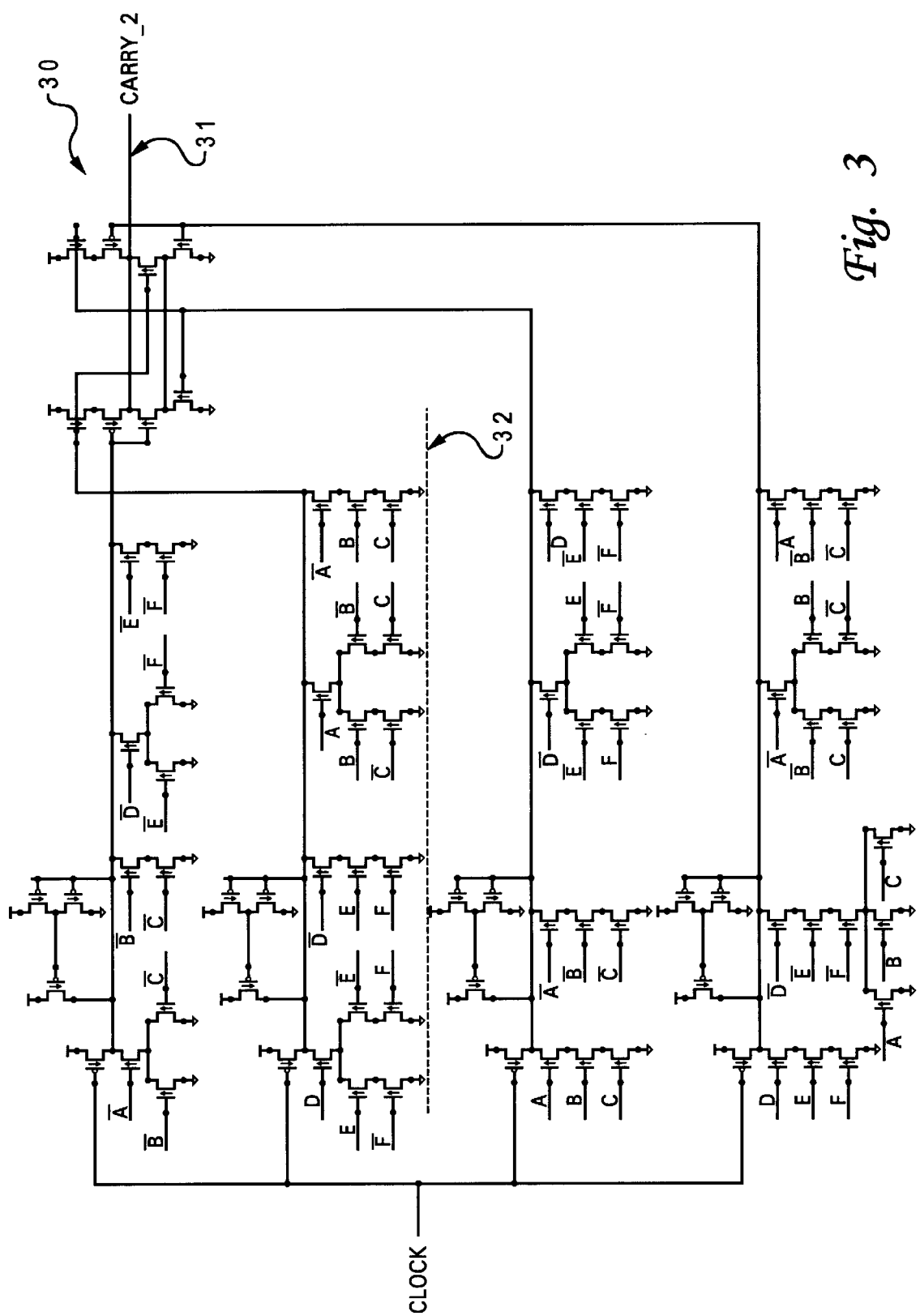
FIG. 3 is a schematic diagram of a circuit for generating a CARRY_2 output for the 6-to-3 carry-save adder from FIG. 1, in accordance with a preferred embodiment of the present invention.

Referring now to FIG. 3, there is depicted a schematic diagram of a circuit for generating a CARRY_2 bit for 6-to-3 carry-save adder 10 from FIG. 1, in accordance with a preferred embodiment of the present invention. The objective of circuit 30 is to detect a sum of 2, 3, or 6 from the six data inputs. Again, the six data inputs are divided into two groups, having three inputs in each group.

When one group contains all logical 0's (i.e., a sum of 0), CARRY_2 output 31 will be asserted only if the sum of the other group is a 2 or 3. When there is only a single logical 1 contained in one group (i.e., a sum of 1), CARRY_2 output 31 will be asserted only if the sum of the other group is a 1 or 2. When there are two logical 1's contained in one group (i.e., a sum of 2), the sum of the other group must be a 0 or 1 in order to assert CARRY_2 output 31. Finally, if there are three logical 1's contained in one group (i.e., a sum of 3), the sum of the other group must be a 0 or 3 in order to assert CARRY_2 output 31. The conditions for asserting CARRY_2 output 31 are summarized in Table I. Other than the conditions listed in Table I, CARRY_2 output 31 will not be asserted.

TABLE I

| row | sum of Group I | sum of Group II |
|---|---|---|
| 1 | 0 | 2 |
| 2 | 0 | 3 |
| 3 | 1 | 1 |
| 4 | 1 | 2 |
| 5 | 2 | 0 |
| 6 | 2 | 1 |
| 7 | 3 | 0 |
| 8 | 3 | 3 |

Circuit 30 utilizes an orthogonal circuit arrangement that is similar to circuit 20 in FIG. 2 for generating an output at CARRY_2 output 31. As shown, the top half of circuit 30 (i.e., above dashed line 32) is responsible for asserting CARRY_2 output 31 when the conditions listed in one of rows one, four, five, and six of Table I are met. On the other hand, the bottom half of circuit 30 (i.e., below dashed line 32) is responsible for asserting CARRY_2 output 31 when the conditions listed in one of rows two, three, seven, and eight of Table I are met.

Figure 4:
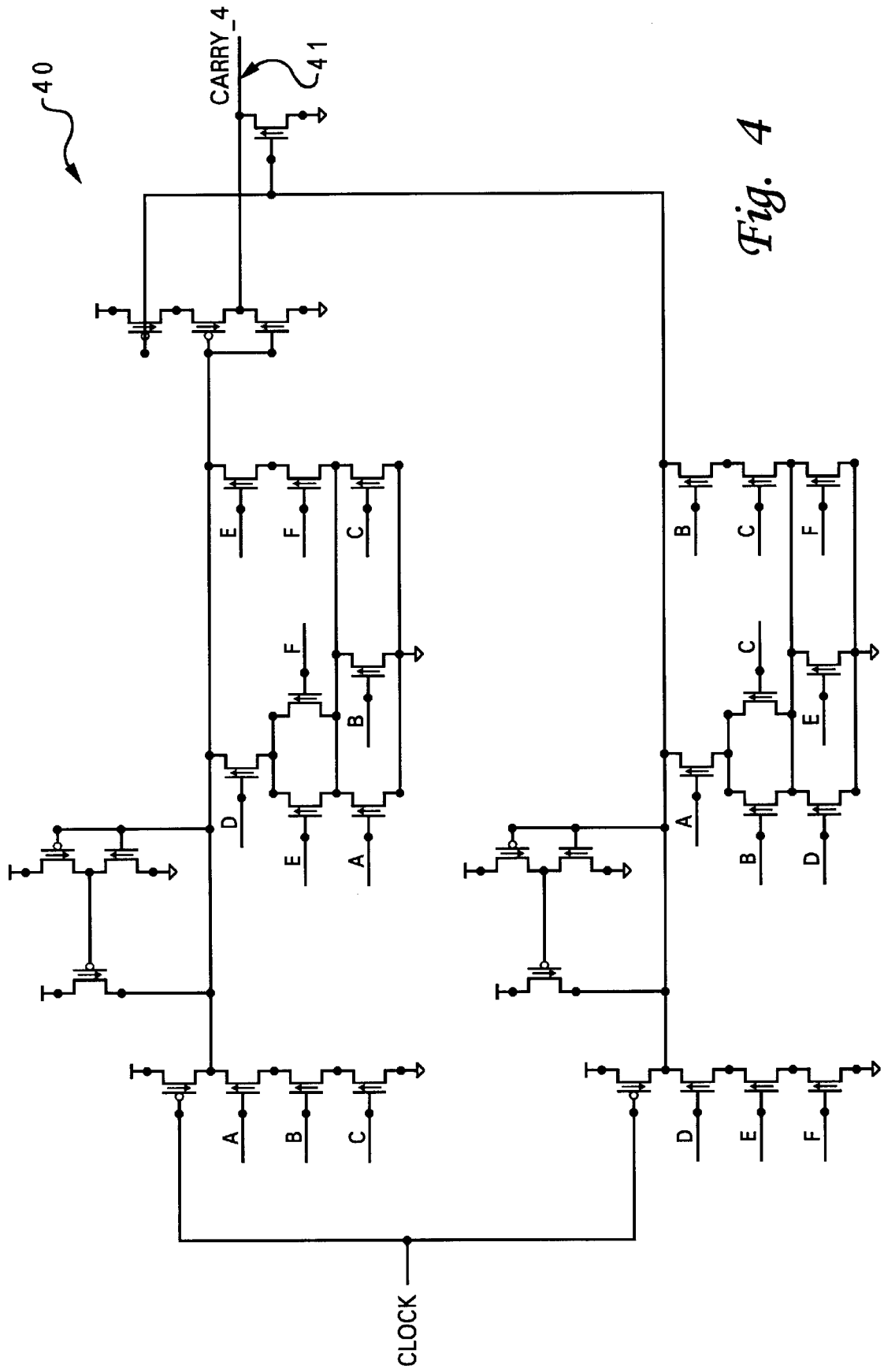
FIG. 4 is a schematic diagram of a circuit for generating a CARRY_4 output for the 6-to-3 carry-save adder from FIG. 1, in accordance with a preferred embodiment of the present invention.

With reference now to FIG. 4, there is depicted a schematic diagram of a circuit for generating a CARRY_4 output for 6-to-3 carry-save adder 10 from FIG. 1, in accordance with a preferred embodiment of the present invention. The objective of circuit 40 is to detect a sum of the six data inputs that is equal to or greater than 4. The six data inputs are also divided into two groups, with three inputs in each group.

When one group contains a single logical 1 (i.e., a sum of 1), the other group must have a sum of 3 for CARRY_4 output 41 to be asserted. When there are two logical 1's contained in one group (i.e., a sum of 2), CARRY_4 output 41 will be asserted if the sum of the other group is a 2 or 3. Finally, if there are three logical 1's contained in one group (i.e., a sum of 3), CARRY_4 output 41 will be asserted if the sum of the other group is a 1, 2, or 3. The conditions for asserting CARRY_4 output 41 are summarized in Table II. Other than the conditions listed in Table II, CARRY_4 output 41 will not be asserted.

TABLE II

| sum of Group I | sum of Group II |
|---|---|
| 1 | 3 |
| 2 | 2 or 3 |
| 3 | 1, 2, or 3 |

Again, circuit 40 utilizes an orthogonal circuit arrangement that is similar to circuit 20 in FIG. 2 and circuit 30 in FIG. 3 for generating a CARRY_4 output 41.

It will be appreciated by those skilled in the art that the 6-to-3 CSA as described may be applicable to a variety of processing devices. These processing devices include but are not limited to complex instruction set computing (CISC) processors and reduced instruction set computing (RISC) processors. Such processors typically comprise at least one processing unit, one or more cache memories associated with each processing unit, and various control logic circuits as are well-known in the art.

Figure 5:
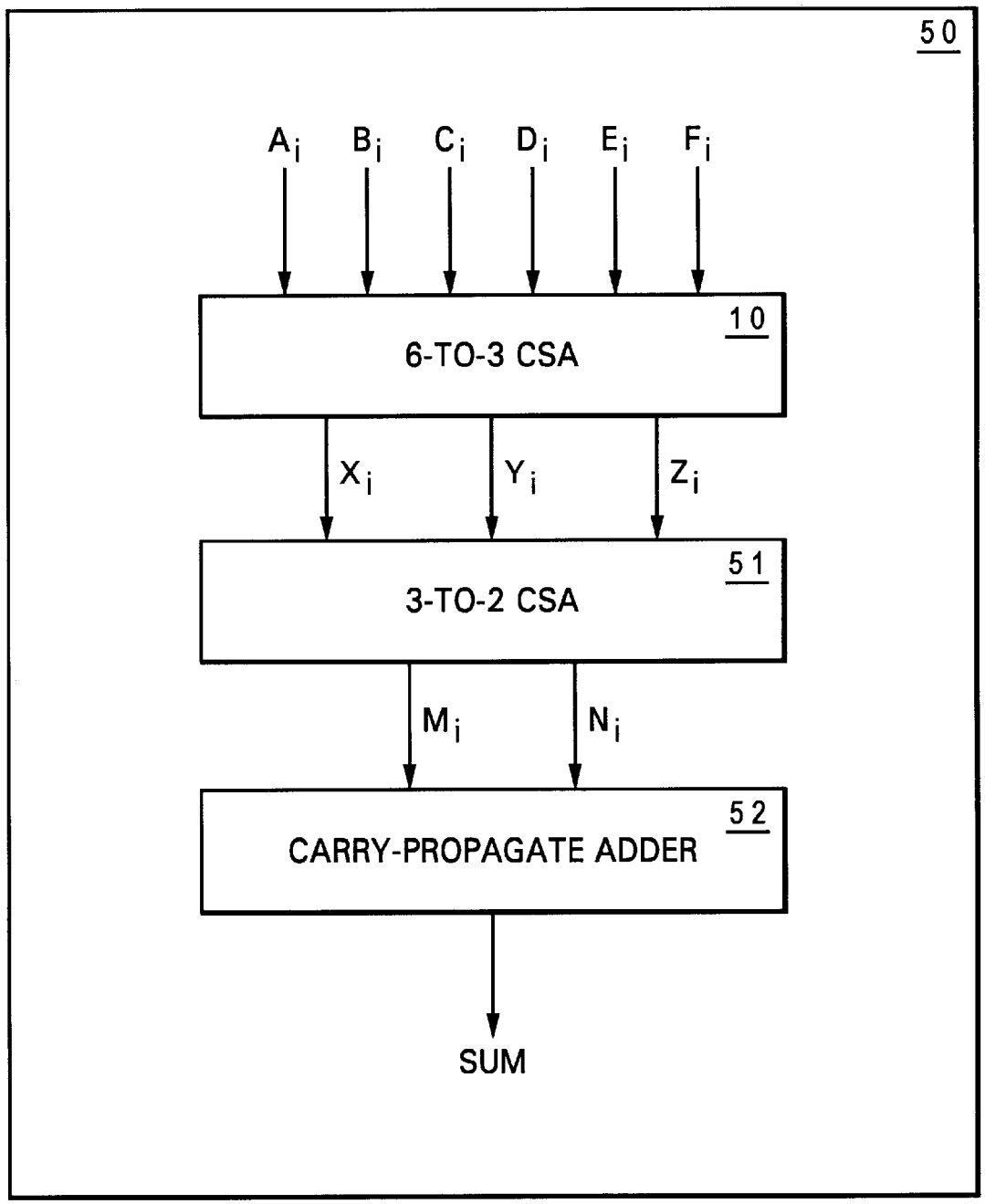
FIG. 5 is a block diagram of an exemplary processor including a 6-to-3 carry-save adder, in accordance with a preferred embodiment of the present invention.

Referring now to FIG. 5, there is depicted of a block diagram of an exemplary processor including 6-to-3 CSA 10 from FIG. 1, in accordance with a preferred embodiment of the present invention. As shown, 6-to-3 CSA 10 can be utilized to add six binary numbers ($A_i$ to $F_i$) simultaneously within a processor 50. The six binary numbers are reduced to three binary numbers ($X_i$ to $Z_i$) by 6-to-3 CSA 10. A 3-to-2 CSA 51 is then utilized to further reduce the three binary numbers to two binary numbers ($M_i$ and $N_i$). Finally, a carry-propagate adder 52 is utilized to add the two binary numbers to produce a final SUM.

FIG. 5 also demonstrates the benefit of using a 6-to-3 CSA to reduce six binary numbers to three binary numbers. If only 3-to-2 CSAs were utilized, it would take three separate reduction steps, i.e., 6-to-4, 4-to-3, and 3-to-2, before the final SUM can be generated. Thus, for the addition of six binary numbers, the usage of a 6-to-3 CSA eliminates one level of circuit logic as compared to implementations in which only 3-to-2 CSAs are utilized.

As has been described, the present invention provides a 6-to-3 CSA. Although only single bit data inputs are utilized to illustrate the present invention for the sake of simplicity, it should be understood that the present invention is equally applicable to 6-to-3 CSAs having multiple-bit inputs. Furthermore, the circuits for producing a SUM, a CARRY_2, and a CARRY_4, as depicted in FIGS. 2, 3, and 4, respectively, are simply exemplary, while other circuit combinations for generating the above-mentioned outputs are also permissible.

While the invention has been particularly shown and described with reference to a preferred embodiment, it will be understood by those skilled in the art that various changes in form and detail may be made therein without departing from the spirit and scope of the invention.

What is claimed is:

1. A carry-save adder, comprising:
   a first circuit means for receiving at least six data inputs; and
   a second circuit means for simultaneously adding said at least six data inputs to generate a SUM output;
   a third circuit means for simultaneously adding said at least six data inputs to generate a CARRY_2 output;
   a fourth circuit means for simultaneously adding said at least six data inputs to generate a CARRY_4 output, wherein said second circuit means, said third circuit means and said fourth circuit means operates concurrently and independently to generate said SUM output, said CARRY_2 output, and said CARRY_4 output, respectively.

2. The carry-save adder according to claim 1, wherein said SUM output is asserted when a sum of said at least six data inputs is an odd number.

3. The carry-save adder according to claim 1, wherein said CARRY_2 output is asserted when a sum of said at least six data inputs is a 2, 3, or 6.

4. The carry-save adder according to claim 1, wherein said CARRY_4 output is asserted when a sum of said at least six data inputs is equal to or greater than 4.

5. A processing device, comprising:
   at least one carry-save adder for adding a first multiple-bit number to a second multiple-bit number, wherein said at least one carry-save adder includes:
      a first circuit means for receiving at least six data inputs; and
      a second circuit means for simultaneously adding said at least six data inputs to generate a SUM output;
      a third circuit means for simultaneously adding said least six data inputs to generate a CARRY_2 output;
      a fourth circuit means for simultaneously adding said at least six data inputs to generate a CARRY_4 output, wherein said second circuit means, said third circuit means and said fourth circuit means operates concurrently and independently to generate said SUM output, said CARRY_2 output, and said CARRY_4 output, respectively;
   a carry-propagate adder, coupled to said at least one carry-save adder, for producing a sum of said first multiple-bit number and said second multiple-bit number.

6. The processing device according to claim 5, wherein said SUM output is asserted when a sum of said at least six data inputs is an odd number.

7. The processing device according to claim 5, wherein said CARRY_2 output is asserted when a sum of said at least six data inputs is a 2, 3, or 6.

8. The processing device according to claim 5, wherein said CARRY_4 output is asserted when a sum of said at least six data inputs is equal to or greater than 4.

* * * * *

UNITED STATES PATENT AND TRADEMARK OFFICE
CERTIFICATE OF CORRECTION

PATENT NO.    : 6,345,286 B1  Page 1 of 1
DATED         : February 5, 2002
INVENTOR(S)   : Dhong et al.

It is certified that error appears in the above-identified patent and that said Letters Patent is hereby corrected as shown below:

<u>Title page, Item [54] and Column 1, line 1,</u>
Title, please change "6-TO-3 CARRY-SAVE ADDER" to -- A 6-TO-3 CARRY-SAVE ADDER --.

Signed and Sealed this

Tenth Day of September, 2002

*Attest:*

JAMES E. ROGAN
*Attesting Officer*       *Director of the United States Patent and Trademark Office*